United States Patent

Huang et al.

(10) Patent No.: US 10,007,446 B2
(45) Date of Patent: Jun. 26, 2018

(54) METHOD, APPARATUS, AND STORAGE MEDIUM FOR WRITING DATA INTO PERSISTENT STORAGE DEVICE

(71) Applicant: Macronix International Co., Ltd., Hsinchu (TW)

(72) Inventors: Wei-Chieh Huang, Hsinchu (TW); Li-Chun Huang, Hsinchu (TW); Yu-Ming Chang, Jiadong Township (TW); Hung-Sheng Chang, Hsinchu (TW); Hsiang-Pang Li, Zhubei (TW); Ting-Yu Liu, Hsinchu (TW); Chien-Hsin Liu, Hsinchu (TW); Nai-Ping Kuo, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 37 days.

(21) Appl. No.: 14/703,941

(22) Filed: May 5, 2015

(65) Prior Publication Data

US 2016/0328161 A1 Nov. 10, 2016

(51) Int. Cl.
*G06F 3/06* (2006.01)
*G06F 12/02* (2006.01)

(52) U.S. Cl.
CPC ............ *G06F 3/0619* (2013.01); *G06F 3/065* (2013.01); *G06F 3/067* (2013.01); *G06F 12/0238* (2013.01); *G06F 2212/1024* (2013.01); *G06F 2212/7201* (2013.01); *G06F 2212/7203* (2013.01)

(58) Field of Classification Search
CPC ........ G06F 3/0619; G06F 3/067; G06F 3/065; G06F 2212/68; G06F 12/1027
See application file for complete search history.

(56) References Cited

U.S. PATENT DOCUMENTS

| | | | | |
|---|---|---|---|---|
| 5,353,430 A | * | 10/1994 | Lautzenheiser | ..... G06F 11/1435 710/52 |
| 2003/0182571 A1 | * | 9/2003 | Hashimoto | ......... G06F 12/1475 713/194 |
| 2004/0193782 A1 | * | 9/2004 | Bordui | ................ G06F 12/0804 711/103 |
| 2007/0204128 A1 | * | 8/2007 | Lee | ...................... G06F 12/0246 711/173 |
| 2008/0091875 A1 | * | 4/2008 | Mannenbach | ........ G06F 12/121 711/113 |
| 2011/0078393 A1 | | 3/2011 | Lin | |
| 2013/0042056 A1 | * | 2/2013 | Shats | .................. G06F 12/0246 711/103 |

FOREIGN PATENT DOCUMENTS

TW   201111986   4/2011

* cited by examiner

*Primary Examiner* — Larry T Mackall
(74) *Attorney, Agent, or Firm* — Finnegan, Henderson, Farabow, Garrett & Dunner LLP

(57) ABSTRACT

A method for writing data into a persistent storage device includes grouping a plurality of data entries stored in a temporary storage device to form a data unit, such that the data unit has a size equal to an integer multiple of a size of an access unit of the persistent storage device. The method further includes writing the data unit into the persistent storage device.

20 Claims, 3 Drawing Sheets

METHOD, APPARATUS, AND STORAGE MEDIUM FOR WRITING DATA INTO PERSISTENT STORAGE DEVICE

TECHNOLOGY FIELD

The disclosure relates to data writing and, more particularly, to a method, apparatus, and storage medium for writing data into a data storage device.

BACKGROUND

For many types of persistent storage devices, such as NAND flash memories or phase-change memories (PCMB), data writing or reading is performed in access units. That is, unlike a random access memory into which data can be written bit-by-bit, there is a minimum size for the access units of such a persistent storage device. The access unit may be, for example, a NAND page having a size of, e.g., 2 kB, 4 kB, or 8 kB, a main memory page having a size of, e.g., 4 kB, or a storage block having a size of, e.g., 512 B. In such a persistent storage device, a write operation needs to be performed for an entire access unit, e.g., page or block, at the same time, and thus a small piece of data that is smaller than the size of the access unit usually cannot be individually written to the persistent storage device.

In many applications, the persistent storage device is used together with a temporary storage device (also referred to as a fast device, which may include, for example, a random-access memory (RAM), such as a static random-access memory (SRAM), a dynamic random-access memory (DRAM), a phase-change memory (PCM), or a resistive random-access memory (RRAM)). Data stored on the persistent storage device may be read to the temporary storage device, and then processed in the temporary storage device. During the process, a portion of the data read into the temporary storage device may be modified, and the modified portion may then need to be written back into the persistent storage device to update the data stored in the persistent storage device. In such a scenario, a read-modify-write process needs to be performed, as described below in detail.

As shown in FIG. 1A, data sequence 102 is saved on a persistent storage device. The data sequence 102 includes a plurality of data segments, each of which has a size equal to the size of the access unit of the persistent storage device. For example, one of the data segments, i.e., a data segment 104 in FIG. 1A, includes three data entries 104-1, 104-2, and 104-3. Further, the data segment 104 is read into the temporary storage device and during the process in the temporary storage device, the data entry 104-2 is modified and the modified data entry (also referred to as a "dirty data entry") is noted as 104-2' in FIG, 1A. The modified data entry 104-2' now needs to be written back to the persistent storage device to update the data entry 104-2 stored therein. As shown in FIG. 1B, the data entries 104-1 and 104-3 are read from the persistent storage device to the temporary storage device. An entire data segment 104' that consists of the data entries 104-1, 104-2', and 104-3 is then written back to the persistent storage device, as shown in FIG. 1C.

Thus, in such a read-modify-write process described above, an additional read step is performed when a piece of data needs to be written back to the persistent storage device. Therefore, the performance of the entire system is degraded.

SUMMARY

In accordance with the disclosure, there is provided a method for writing data into a persistent storage device. The method includes grouping a plurality of data entries stored in a temporary storage device to form a data unit, such that the data unit has a size equal to an integer multiple of a size of an access unit of the persistent storage device. The method further includes writing the data unit into the persistent storage device.

Also in accordance with the disclosure, there is provided an apparatus including a persistent storage device configured to store data, a temporary storage device configured to temporarily store data, a processor, and a non-transitory computer-readable storage medium storing instructions. The instructions, when executed by the processor, cause the processor to group a plurality of data entries stored in the temporary storage device to form a data unit, such that the data unit has a size equal to an integer multiple of a size of an access unit of the persistent storage device. The instructions further cause the processor to write the data unit into the persistent storage device.

Also in accordance with the disclosure, there is provided a non-transitory computer-readable storage medium storing instructions that, when executed by a processor, cause the processor to group a plurality of data entries stored in a temporary storage device to form a data unit, such that the data unit has a size equal to an integer multiple of a size of an access unit of the persistent storage device. The instructions further cause the processor to write the data unit into the persistent storage device.

Features and advantages consistent with the disclosure will be set forth in part in the description which follows, and in part will be obvious from the description, or may be learned by practice of the disclosure. Such features and advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention,

DESCRIPTION OF THE EMBODIMENTS

Embodiments consistent with the disclosure include a method, apparatus, and storage medium for writing data.

Hereinafter, embodiments consistent with the disclosure will be described with reference to the drawings. Wherever possible, the same reference numbers will be used throughout the drawings to refer to the same or like parts.

Figure 1A:
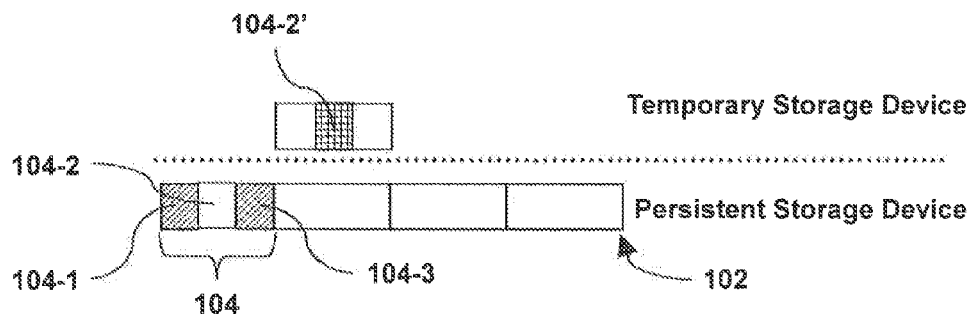
FIGS. 1A-1C schematically show a data writing method according to a conventional technology.
Figure 1B:
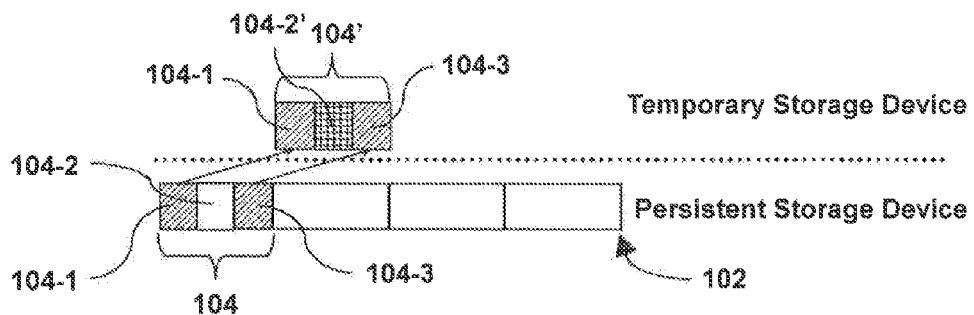
Figure 1C:
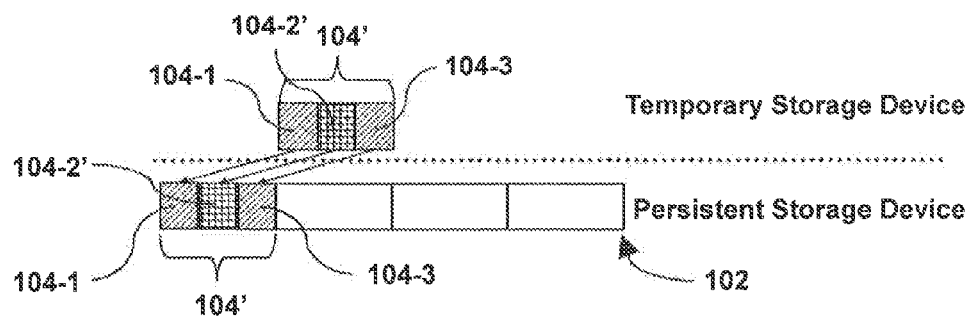
Figure 2:
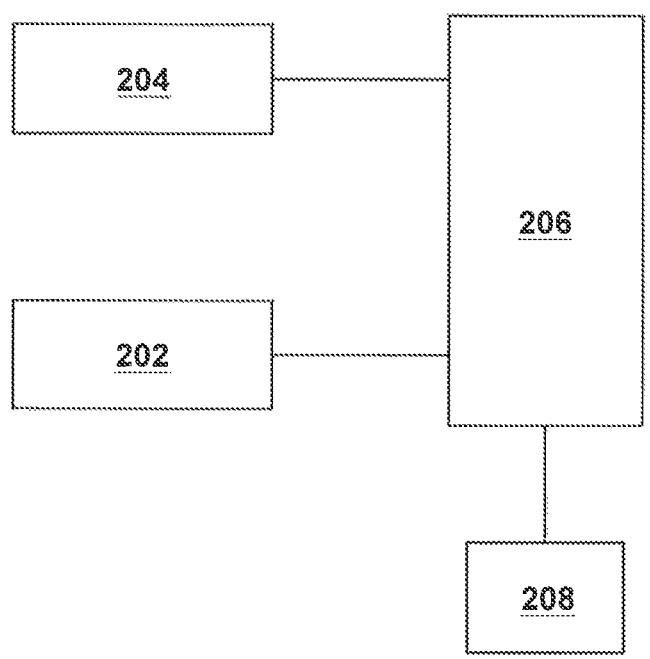
FIG. 2 schematically shows an apparatus according to an exemplary embodiment.

FIG. 2 schematically shows an apparatus 200 consistent with embodiments of the disclosure. The apparatus 200 includes a persistent storage device 202 configured to store data. The persistent storage device 202 may be a non-volatile memory device, for example, a flash memory (such as a NAND flash memory), a main memory, or a phase-change memory (PCM). The persistent storage device 202 has a minimum unit for read or write, which is referred to herein as an access unit. Depending on the type of the persistent storage device, a size of the access unit may be, for example, 512 B, 2 kB, 4 kB, or 8 kB.

The apparatus 200 also includes a temporary storage device 204 configured to temporarily store data. The temporary storage device 204 may be a volatile memory device, for example, a static random-access memory (SRAM) (such as an SRAM of a controller), a dynamic random-access memory (DRAM), a translation lookaside buffer (TLB), or a cache. In some embodiments, the temporary storage device 204 may be a non-volatile memory device, such as a PCM or a resistive random-access memory (RRAM).

The apparatus 200 further includes a processor 206 and a non-transitory computer-readable storage medium 208. The processor 206 is configured to control the operation of the apparatus 200, such as writing data to or reading data from the persistent storage device 202 or the temporary storage device 204. The storage medium 208 may be a separate, individual storage medium. Alternatively, the storage medium 208 may be a portion of the persistent storage device 202 or a portion of the temporary storage device 204. The storage medium 208 stores instructions to be executed by the processor 206 to perform methods consistent with embodiments of the disclosure.

Figure 3:
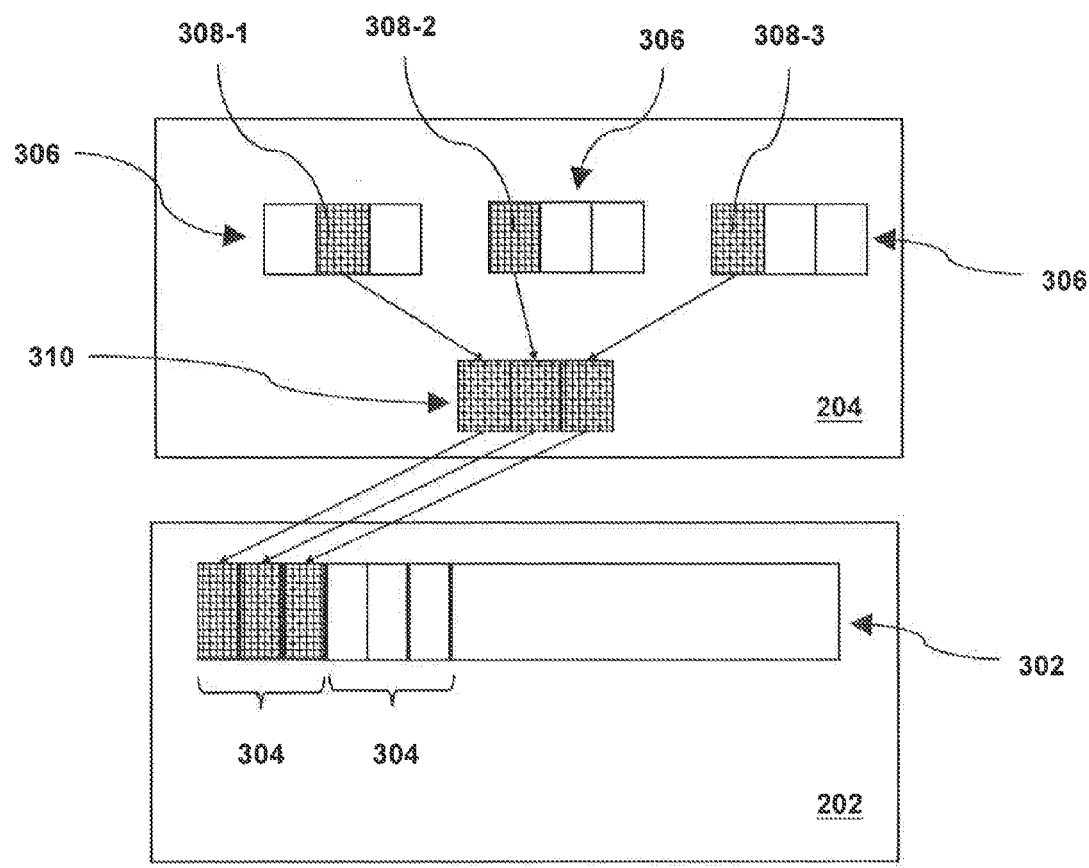
FIG. 3 schematically shows a data writing method according to an exemplary embodiment.

Methods consistent with embodiments of the disclosure are described with reference to FIG. 3. As shown in FIG. 3, the persistent storage device 202 has a continuous storage space 302 including a plurality of access units 304. Each of the access units 304 includes a plurality of storage cells continuously arranged in a cell array. Depending on the type of the persistent storage device 202, the access units 304 may be pages or blocks of different sizes.

Correspondingly, the temporary storage device 204 has a plurality of storage units 306. The storage units 306 may include data read from the persistent storage device 202 and stored in the temporary storage device 204. During the operation of the apparatus 200, a portion of such data may be modified.

In some embodiments, each of the storage units 306 can have a size equal to the size of one access unit 304, and thus one storage unit 306 of the temporary storage device 204 can be written into the persistent storage device 202 at one time as a whole unit. It is noted, however, that a storage unit 306 may represent a unit piece of data stored in the temporary storage device 204 that may be handled when transferring data between the temporary storage device 204 and the persistent storage device 202. It does not mean that writing data to and reading data from the temporary storage device 204 must be performed one storage unit by one storage unit.

In some embodiments, the size of the storage unit 306 may be different from the size of the access unit 304. For example, the size of the storage unit 306 may be 4 kB while the size of the access unit 304 may be 6 kB.

As shown in FIG. 3, each storage unit 306 includes a plurality of data entries that may be handled individually in the temporary storage device 204. For illustration purpose, the storage units 306 depicted in FIG. 3 each have three data entries. However, consistent with the disclosure, one storage unit 306 may contain greater or fewer data entries. During the operation of the apparatus 200, some or all of the data entries may be modified, and the modified data entries then need to be written back to the persistent storage device 202. Consistent with embodiments of the disclosure, modified data entries (also referred to as "dirty entries") from at least two different storage units 306 are collected and the collected data entries are grouped to form a unit that is to be written to the persistent storage device 202. Such a unit is also referred to as a data unit, which is then written into the persistent storage device 202 at one time as a whole unit. In some embodiments, the data unit has a size equal to the size of the access unit.

For example, the storage units 306 shown in FIG. 3 each have one data entry 308-1, 308-2, or 308-3 that has been modified and needs to be written back to the persistent storage device 202. Consistent with the disclosure, the data entries 308-1, 308-2, and 308-3 are collected and grouped to form a data unit 310 having a size equal to the size of the access unit of the persistent storage device 202. Thereafter, the data unit 310 is written into the persistent storage device 202 at one time as a whole unit. Consistent with the disclosure, the data unit 310 is written into continuous storage locations in the persistent storage device 202.

In the embodiments described above, a data unit, such as the data unit 310 shown in FIG. 3, has a same size as an access unit, such as the access unit 304 in FIG. 3. However, consistent with embodiments of the disclosure, the size of the data unit may be an integer multiple of the size of the access unit. That is, the size of the data unit may be one, two, three, or even more times, the size of the access unit. If the size of the data unit 310 is two or more times of the size of the access unit 304, the data unit 310 is written into several access units 304 of the persistent storage device.

The methods consistent with the disclosure can be utilized in writing any kind of data that is handled, processed, or modified in a unit having a size smaller than the size of the access unit of a persistent storage device, such as the persistent storage device 202 in the apparatus 200. For example, in the computer technology field, many different kinds of metadata are utilized, such as data mapping information. The data mapping information includes addresses of data stored in a data storage device, such as the persistent storage device 202, and may be collectively recorded in a data mapping table. The data mapping information is usually processed or modified in a unit (also referred to as a "granule") smaller than the size of the access unit of the persistent storage device 202.

The data mapping table may be saved in the persistent storage device 202. During operation of the apparatus 200, a part of the data mapping table or the entire data mapping table is read from the persistent storage device 202 to the temporary storage device 204. As an example of mapping architecture, multilevel mapping is a popular scheme in modern computer technology. A multi-level mapping table includes a plurality of levels each having one or more mapping elements. A mapping element in a level other than the lowest level (also referred to as a "bottom level") indicates an address of a data location in another level that is one level below, while a mapping element in the lowest level points to a location of actual data (not metadata) stored in the persistent storage device 202.

During the operation of the apparatus 200, all of the mapping elements in the levels except the lowest level and at least a part of the mapping elements in the lowest level may be stored in the temporary storage device 204, and may be modified. The modified mapping elements then need to be written back to the persistent storage device 202 to update the data mapping information stored therein. The mapping information stored in the temporary storage device 204 is usually handled in a unit (referred to as "mapping unit") of mapping information containing a plurality of mapping elements. During the operation of the apparatus 200, the mapping information may be modified in a unit smaller than the mapping unit. Such a smaller unit is also referred to as a mapping entry. Each mapping entry may include one or more mapping elements, but is smaller in size than the mapping unit. The size of the mapping entry may also be smaller than the size of the access unit 304. A mapping unit may include, for example, three mapping entries.

During the operation of the apparatus 200, for one mapping entry, all or some of the mapping elements in that mapping entry may be modified and thus need to be written back to the persistent storage device 202. Consistent with the present disclosure, no matter how many mapping elements in one mapping entry are modified, the entire mapping entry containing the modified mapping element(s) needs to be written back to the persistent storage device 202. Such a mapping entry is also referred to as a modified mapping entry. Writing of modified mapping elements, i.e., modified mapping entries, back into the persistent storage device 202 can be performed using the methods described above, That is, from the mapping units, mapping entries, such as mapping entries in the lowest level, that contain modified mapping elements are collected and grouped to form a data unit, which has a size equal to the size of the access unit of the persistent storage device 202. In some embodiments, mapping entries from mapping units at different levels of the mapping table are collected and grouped to form the data unit. The number of mapping entries to be grouped to form one data unit depends on the size of one mapping entry. For example, if the size of the mapping entry is one third of the size of the access unit 304, then three, six, or nine mapping entries (from at least two different mapping units) may be grouped to form one data unit, as long as the number of mapping entries being grouped is an integer multiple of three. The data unit is then written into the persistent storage device 202, such as continuous storage locations in the persistent storage device 202.

In the above-described example involving handling of mapping information, the mapping units and the mapping entries correspond to the storage units and the data entries, respectively, in the embodiments described in reference to FIG. 3. The data mapping table may include, for example, a page table if the persistent storage device 202 is a main memory (and correspondingly the temporary storage device 204 may be a TLB), or a mapping page if the persistent storage device 202 is a flash memory (and correspondingly the temporary storage device 204 may be an SRAM of a controller).

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for writing data into a persistent storage device, comprising:
   collecting at least one modified data entry from each of at least two storage units in a temporary storage device, each of the at least two storage units containing the at least one modified data entry and at least one unmodified data entry, the at least one modified data entry being at least one data entry that has been modified in the temporary storage device;
   grouping the modified data entries from the at least two storage units in the temporary storage device to form a data unit, such that the data unit has a size equal to an integer multiple of a size of an access unit of the persistent storage device; and
   writing the data unit into the persistent storage device at one time as a whole unit,
   wherein
      collecting the at least one modified data entry includes collecting at least one mapping entry in the temporary storage device from each of at least two mapping units; and
      the data unit includes mapping entries from mapping units at different levels of a mapping table.

2. The method according to claim 1, wherein grouping the modified data entries to form the data unit includes grouping the modified data entries to form the data unit such that the data unit has a size equal to the size of the access unit.

3. The method according to claim 1, wherein collecting the at least one mapping entry from each of the at least two mapping units includes collecting at least one mapping entry from each of at least two mapping units in a bottom level of the mapping table.

4. The method according to claim 1, wherein collecting the at least one mapping entry from each of the at least two mapping units includes collecting at least one mapping entry from each one of at least two mapping units at different levels of the mapping table.

5. The method according to claim 1, further comprising, before grouping the modified data entries:
   reading data from the persistent storage device to the at least two storage units in the temporary storage device; and
   modifying a portion of the data stored in each of the at least two storage units in the temporary storage device to form the at least one modified data entry.

6. The method according to claim 1, wherein writing the data unit into the persistent storage device comprises:
   writing the data unit into a continuous storage location in the persistent storage device.

7. An apparatus comprising:
   a persistent storage device configured to store data;
   a temporary storage device configured to temporarily store data;
   a processor; and
   a non-transitory computer-readable storage medium storing instructions that, when executed by the processor, cause the processor to:
      collect at least one modified data entry from each of at least two storage units in the temporary storage device, each of the at least two storage units containing the at least one modified data entry and at least one unmodified data entry, the at least one modified data entry being at least one data entry that has been modified in the temporary storage device;
      group the modified data entries from the at least two storage units in the temporary storage device to form a data unit, such that the data unit has a size equal to an integer multiple of a size of an access unit of the persistent storage device; and
      write the data unit into the persistent storage device at one time as a whole unit,
   wherein
      the storage medium further stores instructions that cause the processor to collect at least one mapping entry in the temporary storage device from each of at least two mapping units; and
      the data unit includes mapping entries from mapping units at different levels of a mapping table.

8. The apparatus according to claim 7, wherein the storage medium further stores instructions that cause the processor to:

group the modified data entries to form the data unit such that the data unit has a size equal to the size of the access unit.

9. The apparatus according to claim 7, wherein the storage medium further stores instructions that cause the processor to:
collect at least one mapping entry from each of at least two mapping units in a bottom level of the mapping table.

10. The apparatus according to claim 7, wherein the storage medium further stores instructions that cause the processor to:
collect at least one mapping entry from each of at least two mapping units at different levels of the mapping table.

11. The apparatus according to claim 7, wherein the storage medium further stores instructions that cause the processor to, before grouping the modified data entries:
read data from the persistent storage device to the at least two storage units in the temporary storage device; and
modify a portion of the data stored in each of the at least two storage units in the temporary storage device to form the at least one modified data entry.

12. The apparatus according to claim 7, wherein:
the persistent storage device includes a main memory, and
the temporary storage device includes a translation lookaside buffer.

13. The apparatus according to claim 7, wherein:
the persistent storage device includes a flash memory, and
the temporary storage device includes a random access memory of a controller.

14. The apparatus according to claim 7, wherein the storage medium further stores instructions that cause the processor to:
write the data unit into a continuous storage location in the persistent storage device.

15. A non-transitory computer-readable storage medium storing instructions that, when executed by a processor, cause the processor to:
collect at least one modified data entry from each of at least two storage units in a temporary storage device, each of the at least two storage units containing the at least one modified data entry and at least one unmodified data entry, the at least one modified data entry being at least one data entry that has been modified in the temporary storage device;
group the modified data entries from the at least two storage units in the temporary storage device to form a data unit, such that the data unit has a size equal to an integer multiple of a size of an access unit of a persistent storage device; and
write the data unit into the persistent storage device at one time as a whole unit,
wherein
the storage medium further stores instructions that cause the processor to collect at least one mapping entry in the temporary storage device from each of at least two mapping units; and
the data unit includes mapping entries from mapping units at different levels of a mapping table.

16. The storage medium according to claim 15, further storing instructions that cause the processor to:
group the modified data entries to form the data unit such that the data unit has a size equal to the size of the access unit.

17. The storage medium according to claim 15, further storing instructions that cause the processor to:
collect at least one mapping entry from each of at least two mapping units in a bottom level of the mapping table.

18. The storage medium according to claim 15, further storing instructions that cause the processor to:
collect at least one mapping entry from each of at least two mapping units at different levels of the mapping table.

19. The storage medium according to claim 15, further storing instructions that cause the processor to, before grouping the modified data entries:
read data from the persistent storage device to the at least two storage units in the temporary storage device; and
modify a portion of the data stored in each of the at least two storage units in the temporary storage device to form the at least one modified data entry.

20. The storage medium according to claim 15, further storing instructions that cause the processor to:
write the data unit into a continuous storage location in the persistent storage device.

* * * * *